United States Patent
Gorti et al.

(10) Patent No.: US 7,023,159 B2
(45) Date of Patent: Apr. 4, 2006

(54) METHOD AND DEVICE FOR BRAKING A MOTOR

(75) Inventors: Bhanuprasad V. Gorti, Abingdon, MD (US); Hung T. Du, Reisterstown, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/647,807

(22) Filed: Aug. 25, 2003

(65) Prior Publication Data

US 2004/0075408 A1  Apr. 22, 2004

Related U.S. Application Data

(60) Provisional application No. 60/419,352, filed on Oct. 18, 2002.

(51) Int. Cl.
*H02P 7/00* (2006.01)

(52) U.S. Cl. .................. 318/432; 318/139; 318/800

(58) Field of Classification Search ............... 318/432, 318/139, 800, 799, 798, 245, 375, 362, 376, 318/757, 381
See application file for complete search history.

(56) References Cited

U.S. PATENT DOCUMENTS

| | | | |
|---|---|---|---|
| 3,611,092 A | 10/1971 | Wilmunder | |
| 3,732,475 A | 5/1973 | Geerling | |
| 3,947,740 A | 3/1976 | Tsuboi | |
| 4,144,482 A | 3/1979 | Schwab | |
| 4,669,841 A | 6/1987 | Kaneko et al. | |
| 4,933,609 A | 6/1990 | Clark | |
| 5,449,992 A | 9/1995 | Geiger et al. | |
| 5,505,043 A | 4/1996 | Baginski et al. | |
| 5,598,082 A * | 1/1997 | Gilpin et al. | 200/293.1 |
| 5,600,217 A | 2/1997 | Bartlett | |
| 5,635,804 A * | 6/1997 | Tanaka et al. | 318/139 |
| 5,644,112 A | 7/1997 | Geiger et al. | |
| 5,659,231 A | 8/1997 | Svarovsky et al. | |
| 5,764,021 A | 6/1998 | Gutsche | |
| 5,892,885 A | 4/1999 | Smith et al. | |
| 5,913,373 A | 6/1999 | Forrest | |
| 6,005,359 A | 12/1999 | Brambilla et al. | |
| 6,013,993 A | 1/2000 | Barbisch | |
| 6,078,156 A | 6/2000 | Spurr | |
| 6,078,157 A | 6/2000 | Seiler et al. | |
| 6,084,366 A | 7/2000 | Koselke et al. | |
| 6,118,241 A | 9/2000 | Kazlauskas | |
| 6,160,368 A | 12/2000 | Plutowski | |
| 6,170,241 B1 | 1/2001 | Shibilski et al. | |
| 6,188,192 B1 | 2/2001 | Chen | |
| 6,232,758 B1 * | 5/2001 | Konda et al. | 323/351 |
| 6,236,177 B1 | 5/2001 | Zick et al. | |
| 6,237,390 B1 | 5/2001 | Honsel et al. | |
| 6,310,452 B1 | 10/2001 | Deck et al. | |
| 6,373,207 B1 | 4/2002 | Yablonovitch | |
| 6,384,555 B1 * | 5/2002 | Tanaka | 318/280 |
| 6,448,727 B1 | 9/2002 | Rotterhusen | |

(Continued)

FOREIGN PATENT DOCUMENTS

AT   391 384   9/1990

(Continued)

*Primary Examiner*—Karen Masih
(74) *Attorney, Agent, or Firm*—Harness, Dickey & Pierce, P.L.C.

(57) ABSTRACT

A method and apparatus for braking a motor has a braking power switching device coupled across windings of the motor. To brake the motor, the braking power switching device is cycled on and off.

53 Claims, 4 Drawing Sheets

U.S. PATENT DOCUMENTS

| | | |
|---|---|---|
| 6,486,625 B1 | 11/2002 | Vilou |
| 6,525,495 B1 | 2/2003 | Bianchi |
| 6,536,536 B1 | 3/2003 | Gass et al. |
| 6,548,973 B1 | 4/2003 | Chloupek et al. |
| 6,680,596 B1 | 1/2004 | DeCicco |
| 6,686,719 B1 | 2/2004 | Cochoy et al. |
| 6,741,050 B1 | 5/2004 | Wissmach et al. |
| 6,741,051 B1 | 5/2004 | Chu |
| 2002/0056858 A1* | 5/2002 | Torikoshi et al. ........... 257/203 |
| 2002/0158593 A1 | 10/2002 | Henderson et al.1 |
| 2003/0117095 A1 | 6/2003 | Gorti |
| 2004/0037548 A1 | 2/2004 | Higuma |
| 2004/0041531 A1 | 3/2004 | Chu |
| 2004/0066159 A1 | 4/2004 | Zack et al. |

FOREIGN PATENT DOCUMENTS

| | | |
|---|---|---|
| DE | 25 19 509 | 5/1975 |
| DE | 33 24 483 | 1/1985 |
| DE | DD 234 254 | 3/1986 |
| DE | 3546606 | 12/1987 |
| DE | 3636555 | 5/1988 |
| DE | 3539841 | 3/1990 |
| DE | 40 22 637 | 1/1992 |
| DE | 4022637 | 1/1992 |
| DE | 40 38 199 | 6/1992 |
| DE | 42 01 005 | 7/1993 |
| DE | 4200983 | 7/1993 |
| DE | 4200984 | 7/1993 |
| DE | 4200996 | 7/1993 |
| DE | 42 07 362 | 9/1993 |
| DE | 4223216 | 1/1994 |
| DE | 4232402 | 3/1994 |
| DE | 4235774 | 4/1994 |
| DE | 44 29 962 | 2/1996 |
| DE | 4201005 | 7/1996 |
| DE | 4227719 | 7/1996 |
| DE | 195 40 740 | 8/1996 |
| DE | 42 44 805 | 9/1999 |
| DE | 19937786 | 2/2000 |
| DE | 199 59 785 | 6/2001 |
| DE | 10222540 | 11/2003 |
| EP | 0 328 536 | 8/1989 |
| EP | 0 551 895 | 7/1993 |
| EP | 0 551 896 | 7/1993 |
| EP | 0 551 909 | 7/1993 |
| EP | 0 740 407 | 10/1996 |
| EP | 1 385 261 | 1/2004 |
| JP | 49-079000 | 7/1974 |
| JP | 50-032423 | 3/1975 |
| JP | 52-033025 | 3/1977 |
| JP | 52-156326 | 12/1977 |
| JP | 53-006815 | 1/1978 |
| JP | 53-035116 | 4/1978 |
| JP | 54-037214 | 3/1979 |
| JP | 55-117480 | 9/1980 |
| JP | 56-060750 | 5/1981 |
| JP | 57-027791 | 2/1982 |
| JP | 57-170084 | 10/1982 |
| JP | 58-015473 | 1/1983 |
| JP | 58-31791 | 3/1983 |
| JP | 58-175980 | 10/1983 |
| JP | 58-190290 | 11/1983 |
| JP | 60-046785 | 3/1985 |
| JP | 61-295885 | 12/1986 |
| JP | 62-053189 | 3/1987 |
| JP | 62-254679 | 11/1987 |
| JP | 63-039482 | 2/1988 |
| JP | 63-059213 | 3/1988 |
| JP | 04-178192 | 6/1992 |
| JP | 04-208085 | 7/1992 |
| JP | 05-184174 | 7/1993 |
| JP | 06-038565 | 2/1994 |
| JP | 11-215871 | 8/1999 |
| JP | 2003-088150 | 3/2003 |
| JP | 2003-250286 | 9/2003 |
| WO | WO 92/05626 | 4/1992 |

* cited by examiner

METHOD AND DEVICE FOR BRAKING A MOTOR

CROSS-REFERENCE TO RELATED APPLICATIONS

This application claims the benefit of U.S. Provisional Application No. 60/419,352 filed Oct. 18, 2002.

FIELD OF THE INVENTION

The present invention relates to motor braking, and more particularly, to braking a DC motor in power tools.

BACKGROUND OF THE INVENTION

Braking of a DC motor in a power tool is typically accomplished by closing brake contacts across the motor windings after the trigger of the switch that switches power to the motor windings is released. This technique presents a number of problems. It results in very high currents during braking. It may also result in demagnetization of the field magnet as well as accelerating brush wear. It also results in sudden braking, which can be detrimental to the life of the tool transmission. The brake times are also not controllable.

An alternate approach is to connect power resistors across the motor windings during braking. This approach also presents problems. The power resistors are bulky and generate heat. The power resistors typically cannot be packaged in the same package as the switch that switches power to the motor windings, which houses the components for switching power on and off to the motor windings during normal tool operation. Even though the brake currents are lower, the brake times are not controllable by this approach.

FIG. 1 shows a prior art motor control circuit 10 for controlling power to a motor 12 in a cordless power tool electrical system 14 (shown representatively by dashed box 14). Cordless power tool electrical system 14 is illustratively a variable speed system, such as would be used in a variable speed drill. Motor 12 illustratively has a permanent magnet field and a wound armature. Motor control circuit 10 includes switch 16, illustratively a trigger switch, having main power contacts 18, braking contacts 20 and bypass contacts 22. Main power contacts 18 and braking contacts 20 are linked so that they operate in conjunction with each other. Main power contacts 18 are normally open and braking contacts 20 are normally closed and both are break-before-make contacts. The normally open side of main power contacts 18 is connected to the negative terminal of a battery 24 and the common side of main power contacts 18 is connected to controller 26 of motor control circuit 10. Motor control circuit 10 also includes run power switching device 28 and free wheeling diode 30.

Run power switching device 28 is illustratively a N-power MOSFET with its gate connected to an output of controller 26, its source connected to the common side of main power contacts 18 and its drain connected the common side of braking contacts 20 of trigger switch 16, to one side of the windings of motor 12 and to the anode of diode 30. As is known, MOSFETs have diodes bridging their sources and drains, identified as diode 32 in FIG. 1. The other side of braking contacts 20 is connected to the positive side of battery 24 as is the other side of the windings of motor 12 and the cathode of diode 30. Since motor 12 is illustratively a wound armature/permanent magnet field motor, the motor windings to which the drain of run power switching device 28 and the positive side of battery 24 are connected are the armature windings.

Controller 26 is illustratively a pulse width modulator that provides a pulse width modulated signal to the gate of run power switching device 28 having a set frequency and a variable duty cycle controlled by a variable resistance. The variable resistance is illustratively a potentiometer 19 mechanically coupled to trigger switch 16. In this regard, controller 26 can be a LM 555 and potentiometer, the LM 555 configured as a pulse width modulator having a set frequency and a variable duty cycle controlled by the potentiometer that is mechanically coupled to trigger switch 16.

In operation, trigger switch 16 is partially depressed, opening braking contacts 20 and closing, a split second later, main power contacts 18. This couples power from battery 24 to controller 26, to the source of run power switching device 28 and to bypass contacts 22 (that remain open at this point). Controller 26 generates a pulse width modulated signal at the gate of run power switching device 28, cycling it on and off. Run power switching device 28 switches power on and off to the windings of motor 12 as it cycles on and off. The duty cycle of the pulse width modulated signal, that is, how long it is high compared to how long it is low, provided at the gate of run power switching device 28 is determined by how far trigger switch 16 is depressed. (How far trigger switch 16 is depressed determines the variable resistance of the potentiometer 19 mechanically coupled to it that provides the variable resistance used to set the duty cycle of controller 26.) The duty cycle of the pulse width modulated signal determines the speed of motor 12. As trigger switch 16 is depressed further, bypass contacts 22 close, typically when trigger switch 16 is depressed to about the eighty percent level. When bypass contacts 22 close, power is connected directly from the battery 24 to the motor windings and the variable speed control provided by controller 26 and run power switching device 28 is bypassed. Motor 12 then runs at full speed.

Diode 30, known as a free wheeling diode, provides a path for the current in the windings of motor 12 when run power switching device 28 switches from on to off. Current then flows out of the motor windings at the bottom of motor 12 (as oriented in FIG. 1) through diode 30 and back into the motor windings at the top of motor 12 (as oriented in FIG. 1).

When trigger switch 16 is released to stop motor 12, main power contacts 18 of trigger switch 16 open with braking contacts 20 closing a split second later. (Bypass contacts 22, if they had been closed, open as trigger switch 16 is being released.) Closing braking contacts 20 shorts the motor windings of motor 12, braking motor 12.

Where the cordless power tool is not a variable speed tool, such as a saw, controller 26, run power switching device 28, bypass contacts 22 and diode 30 are eliminated. Braking contacts 20 operate in the same manner described above to brake motor 12.

Where the power resistor approach is used, a power resistor is connected in series with braking contacts 20.

Controller 26 and run power switching device 28 are illustratively packaged in the same package as trigger switch 16, as may be diode 30.

SUMMARY OF THE INVENTION

In accordance with an aspect of the invention, a controllable switch (braking power switching device) is connected across the windings of a motor. The braking power switching device is normally open. To brake the motor, the braking power switching device is repeatedly cycled, repeatedly closing and opening across the motor windings. In an aspect of the invention, the switch is a semiconductor switch. In an aspect of the invention, the switch is a field effect transistor (FET). In an aspect of the invention, the switch is a P-channel MOSFET. In an aspect of the invention, the switch is a N-channel MOSFET.

In an aspect of the invention where the braking power switching device is a FET, the internal diode of the FET is used as a free-wheeling diode across the motor windings, eliminating the need for a separate diode across the motor windings.

In an aspect of the invention, the braking power switching device is cycled based on one or more of motor speed, back emf, and in an open loop fashion.

In an aspect of the invention, the motor is part of a cordless power tool having a battery. In an aspect of the invention, the battery is connected to the motor windings during braking. In an aspect of the invention, the battery is not connected to the motor windings during braking.

In an aspect of the invention, the motor is a mains powered motor, that is, a DC motor powered by rectified AC provided by mains. In an aspect of the invention, the mains powered motor is part of a power tool.

In an aspect of the invention, a storage capacitor stores enough energy during operation of the tool, that is, when power is connected to the motor windings, to operate the controllable switch and any braking control circuit that the controllable switch is part of during braking.

In an aspect of the invention, the braking power switching device is packaged as part of a trigger switch package that houses a trigger switch and main power switching device. In an aspect of the invention, a controller that controls the main power switching device also controls the braking power switching device. In an aspect of the invention, the controller is housed in the trigger switch package.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
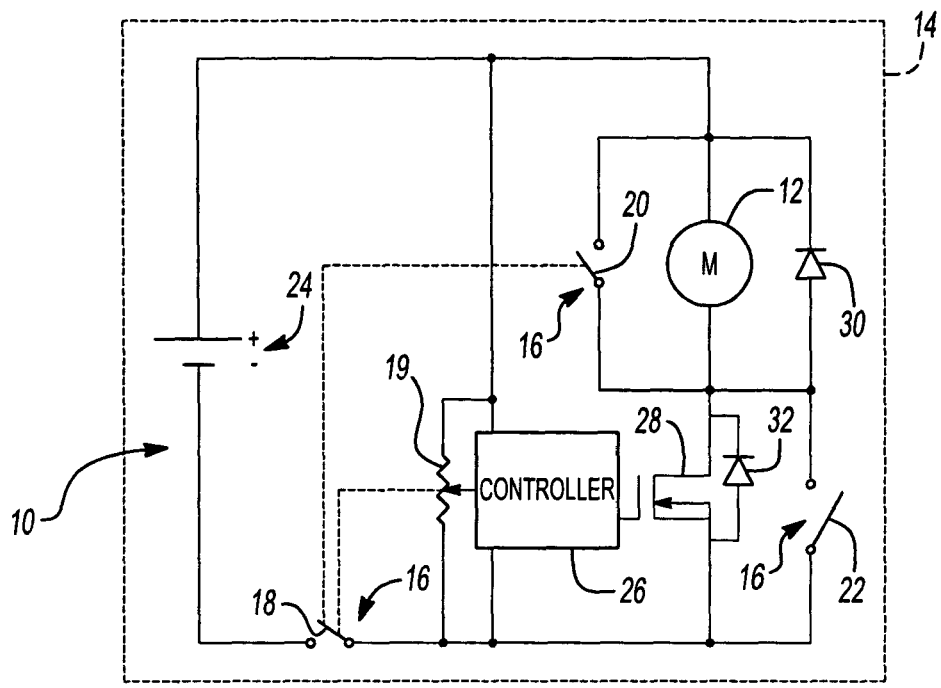
FIG. 1 is a schematic of a prior art motor control circuit in a cordless power tool.
Figure 2:
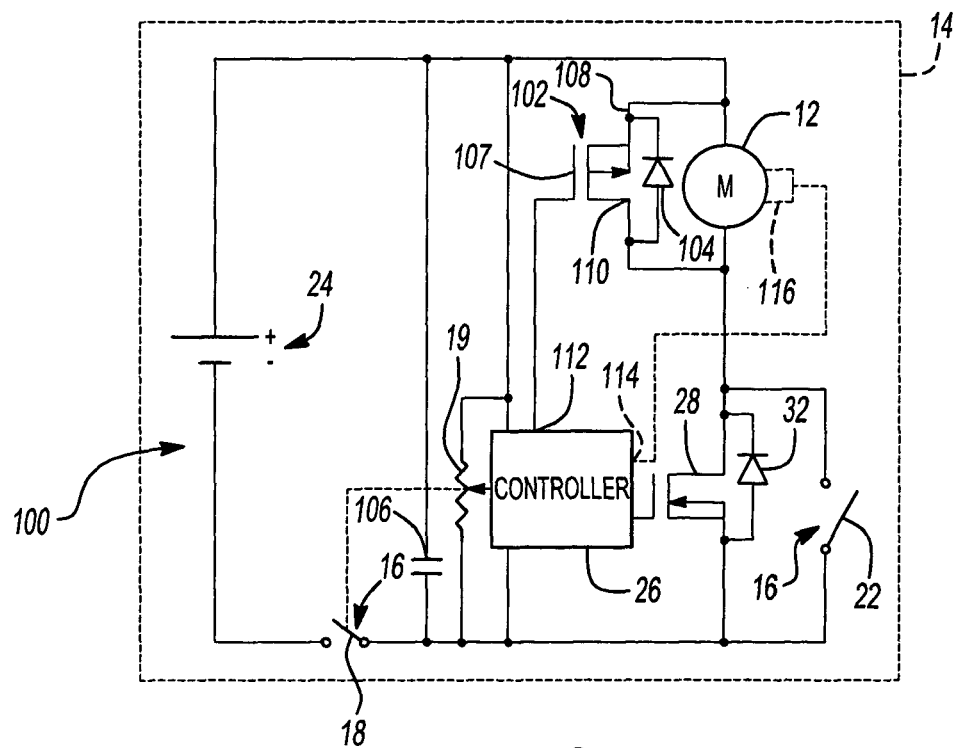
FIG. 2 is a schematic of a motor control circuit for braking a motor in accordance with the invention.

FIG. 2 shows a motor control circuit 100 for controlling power to a motor 12 that brakes motor 12 in accordance with the invention. Elements in common with FIG. 1 will be identified with like elements and the discussion of motor control circuit 100 will focus on the differences between motor control circuit 100 and motor control circuit 10.

Motor control circuit 100 has a braking power switching device 102 connecting the motor windings of motor 12 in place of braking contacts 20 of trigger switch 16. Motor control circuit 100 also has a storage capacitor 106 coupled to controller 26. Diode 30 is eliminated.

Braking power switching device 102 is illustratively a P-channel MOSFET having an internal diode bridging its source and drain, identified as diode 104. Gate 107 of braking power switching device 102 is connected to an output 112 of controller 26. Source 108 of braking power switching device 102 is connected to the positive side of battery 24 and to one side of the windings of motor 12. Drain 110 of braking power switching device 102 is connected to the other side of the windings of motor 12, to the drain of run power switching device 28 and to the normally open side of bypass contacts 22 of trigger switch 16. Internal diode 104 of the MOSFET illustratively used as braking power switching device 102 replaces diode 30 (FIG. 1).

It should be understood that switching devices other than P-channel MOSFETs can be used as braking power switching device 102 provided that such devices have the necessary switching speed. Other types of switching devices that could be used for braking power switching device 102 are N-channel MOSFETS, triacs, SCRs, darlington transistor pairs, IGBTs, other types of power semiconductor switching devices, and certain relays that have sufficient switching speed. In the event that a different type of switching device is used as braking power switching device 102, it may be necessary to add back diode 30 depending on the nature of this device and whether it has an internal diode.

In operation when motor 12 is running at less than full speed under control of run power switching device 28, internal diode 104 of braking power switching device 102 acts as the free-wheeling diode across the windings of motor 12 in the same manner as diode 30 of FIG. 1. When trigger switch 16 is released, main power contacts 18 of trigger switch 16 open, disconnecting power from battery 24 to controller 26 and motor 12. Storage capacitor 106 provides sufficient power to power controller 26 and braking power switching device 102 until motor 12 has been braked. Bypass contacts 22 are open and controller 26 turns run power switching device 28 off.

Controller 26 generates a control signal at output 112 that controls braking power switching device 102. This control signal is a pulsating signal that switches braking power switching device 102 on and off to intermittently short the windings of motor 12, braking motor 12. However, semiconductor switching devices, such as MOSFETs, have a small amount of internal resistance when they are switched on, so the short around the windings of motor 12 is not a true short, but rather has a small amount of resistance. This resistance, combined with the duty cycle, reduces the peak current that flows when the motor windings are shorted during the braking process. An external resistor, illustratively one having a low resistance, may also be connected in series with braking power switching device 102 to further control the current flow and thus the braking operation.

Controller 26 can be configured to provide pulsating output signals at output 112 to control the braking speed and braking current. For example, a free running pulsating signal can be provided, such as a pulse width modulated signal having a set frequency and duty cycle. Controller 26 can be configured to sense motor speed and/or back emf and vary the frequency, duty cycle, or both of a pulse width modulated output signal output at output 112 in response thereto. In this aspect of the invention, controller 26 includes an input 114 coupled to a sensor 116 that senses at least one of motor speed and back emf of motor 12. Controller 26 then utilizes the sensed input to control braking of motor 12 by varying at least one of the frequency and duty cycle of the pulse width modulated signal output by controller 26 at output 112. Controller 26 can also be configured to provide a square wave output signal (e.g., a pulse width modulated signal having a 50—50 duty cycle) or a sine wave.

In another aspect of the invention, main power contacts 18 of trigger switch 16 are not opened during braking of motor 12 and battery 24 remains connected, at least to the windings of motor 12. Upon release of trigger switch 16, controller 26 turns run power switching device 28 off and controls braking power switching device 102 in the manner described and then opens main power contacts 18 once motor 12 has been braked. Bypass contacts 22 are also opened, as described above. This allows for regenerative braking recharging battery 24 to some extent during braking of motor 12 with internal diode 32 of run power switching device 28 providing a current path from the negative terminal of battery 24 to one side of motor 12, the other side of motor 12 being coupled to the positive terminal of battery 24.

In an aspect of the invention, braking power switching device is housed in the same switch package that houses trigger switch 16, controller 26 and run power switching device 28.

Where the power tool is not a variable speed tool, controller 26 controls only braking power switching device 102 in the manner described and run power switching device 28, bypass contacts 22 and diode 30 (if present) are eliminated.

Figure 3:
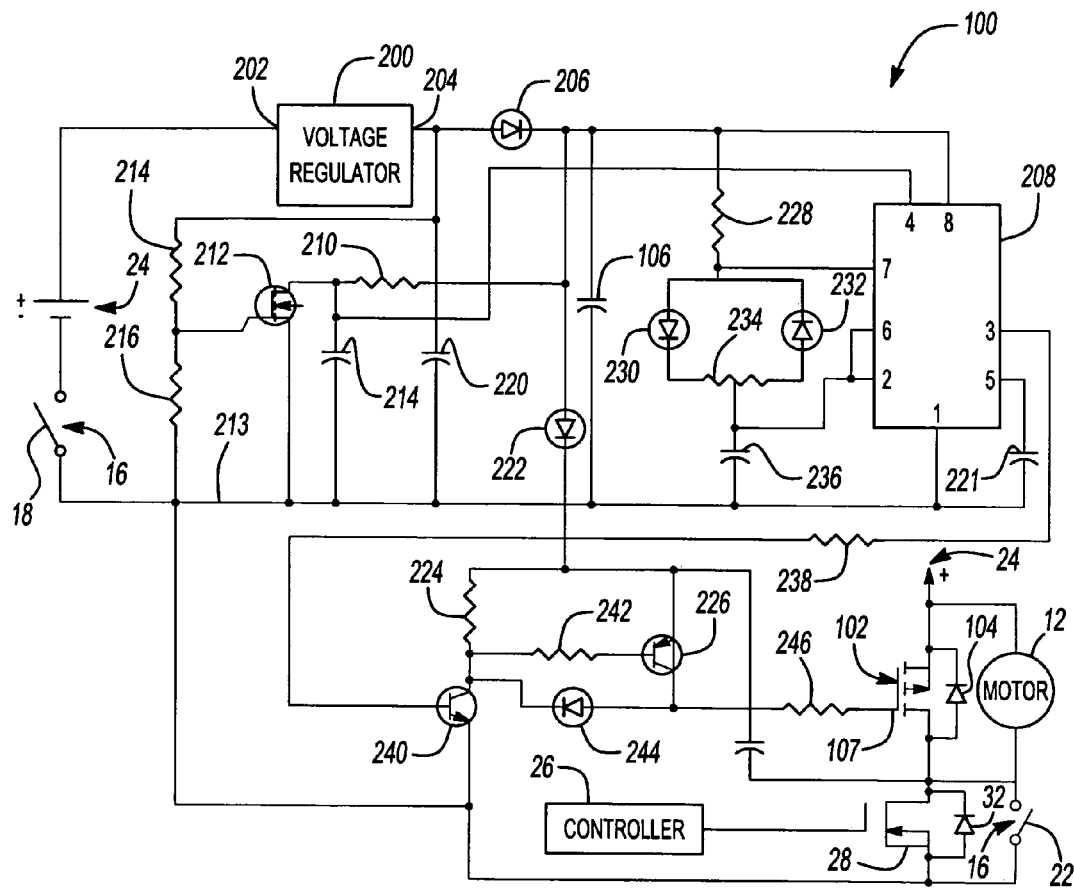
FIG. 3 is a more detailed schematic of the motor control circuit for braking a motor of FIG. 2.

FIG. 3 is a more detailed schematic of the motor control circuit 100 of FIG. 2 for controlling power to motor 12 that brakes motor 12 in accordance with the invention. As shown in FIG. 3, the positive terminal of battery 24 is connected to an input 202 of a nine volt regulator 200. An output 204 of nine volt regulator 200, which provides a positive rail, is coupled to the anode of a diode 206. The cathode of diode 206 is coupled to a power terminal, pin 8, of a timer 208, which is illustratively a LM 555 timer. A common terminal, pin 1, of timer 208 is coupled to a switched common rail 213. The cathode of diode 206 is coupled to one side of capacitor 106, which is illustratively a 470 µF capacitor, and through a resistor 210 to the drain of a FET 212. The other side of capacitor 106 is coupled to switched common rail 213. The cathode of diode 206 is also coupled through a diode 222 to one side of a resistor 224 and the emitter of a transistor 226. The cathode of diode 206 is also coupled through a resistor 228 to pin 7 of timer 208 and to the anode of diode 230 and the cathode of diode 232. The cathode of diode 230 is coupled to one side of a potentiometer 234 and the anode of diode 232 is coupled to the other side of potentiometer 234. A wiper terminal of potentiometer 234 is coupled to pins 2 and 6 of timer 208 and through capacitor 236 to switched common rail 213.

A capacitor 218 is coupled between the drain of FET 212 and switched common rail 213. The drain of FET 212 is coupled to pin 4 of timer 208. The source of FET 212 is coupled to switched common rail 213 and the gate of FET 212 is coupled to a junction of resistors 214, 216. The other side of resistor 214 is coupled to output 204 of voltage regulator 200 and the other side of resistor 216 is coupled to switched common rail 213. Switched common rail 213 is coupled through main contacts 18 of trigger switch 16 to the negative terminal of battery 24. Capacitor 220 is coupled between output 204 of nine volt regulator 200 and switched common rail 213.

An output pin, pin 3, of timer 208 is coupled through a resistor 238 to a base of a transistor 240. A collector of transistor 240 is coupled to the other side of resistor 224 and through a resistor 242 to a base of transistor 226. An emitter of transistor 240 is coupled to switched common rail 213. A collector of transistor 226 is coupled to an anode of a diode 244 and through a resistor 246 to the gate of the FET that is illustratively braking power switching device 102. A cathode of diode 244 is coupled to the collector of transistor 240.

In operation, when main contacts 18 of trigger switch are closed, the voltage divider formed by resistors 214, 216 turns on FET 212, which pulls down terminal 4 of timer 208 turning it off. Capacitor 106 is charged.

When main contacts 18 are opened, FET 212 turns off, allowing pin 4 of timer 208 to be pulled up, turning timer 208 on. Timer 208 outputs a pulse train at output pin 3 that, through transistors 240, 226, is provided to the gate of the FET that is braking power switching device 102, switching the FET on and off to brake motor 12. Potentiometer 234 adjusts the duty cycle and frequency of timer 208. Alternatively, the duty cycle and frequency of timer 208 can be set by replacing potentiometer 234 with a resistor or resistor network.

In the embodiment of FIG. 3, controller 26 includes the control circuit for motor 12 as described in FIG. 1. As discussed with reference to FIG. 2, controller 26 can include the motor braking circuit in which case the elements of FIG. 3 comprising the motor braking circuit would then be included in controller 26.

Figure 4A:
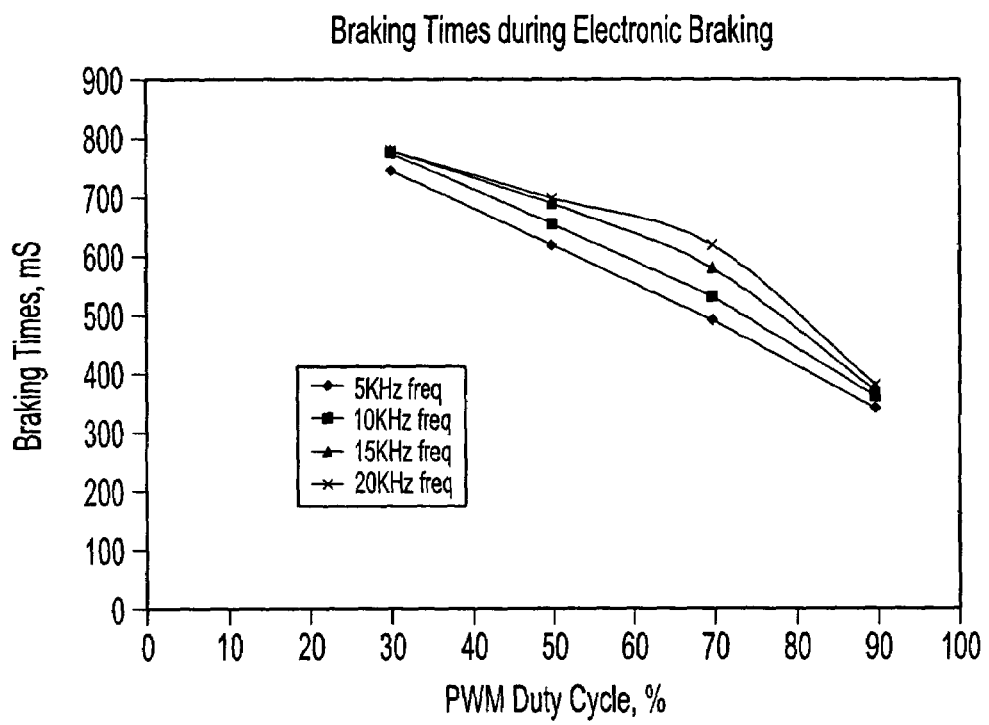
FIG. 4A is a graph showing for the motor control circuit of FIG. 3 braking times for various duty cycles and frequencies.
Figure 4B:
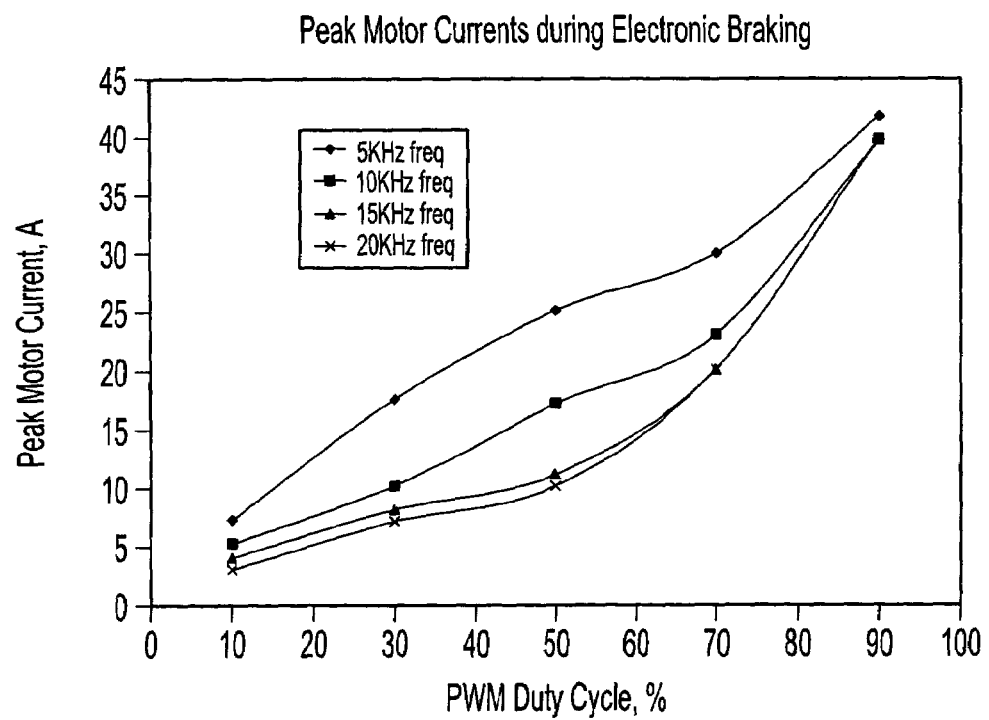
FIG. 4B is a graph showing for the motor control circuit of FIG. 3 peak motor currents during braking for various duty cycles and frequencies.

FIG. 4A is a graph showing braking time for various duty cycles and frequencies and FIG. 4B is a graph showing peak motor currents for various duty cycles and frequencies for a power tool using the motor braking circuit 100 of FIG. 3 where the FET that is braking power switching device 102 is switched with a pulse width modulated signal with varying duty cycles and frequencies. The same power tool using the prior art braking circuit of FIG. 1 has a braking time of about 100 msec. and peak motor current during braking of about 75 A.

It should be understood that while the above described motor braking has been described in the context of a cordless power tool having a DC motor powered by a battery, it should be understood that it can also be utilized with a mains powered power tool having a DC motor that is powered by rectified AC provided by mains.

Figure 5:
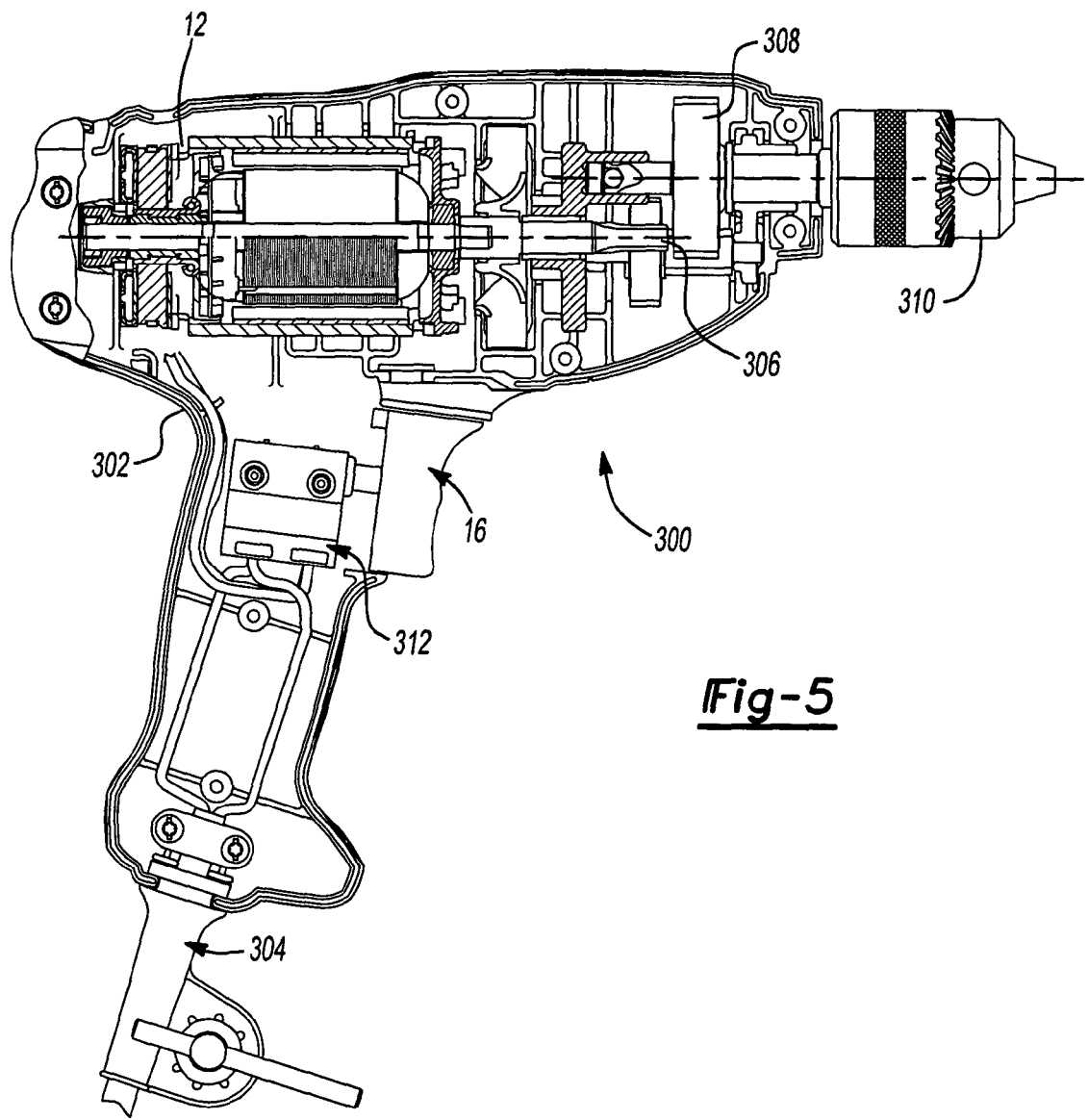
FIG. 5 is a perspective view of a power tool having the motor control circuit of FIG. 3.

Turning to FIG. 5, a power tool in accordance with the present invention is illustrated and designated with the reference numeral 300. The power tool 300 is illustrated as a drill; however, any type of power tool may be used with the motor of the present invention. The power tool 300 includes a housing 302 which surrounds a motor, such as motor 12. An activation member, such as switch 16, is coupled with the motor 12 as well as with a power source 304. The power source 304 is illustratively a battery when power tool 300 is a cordless power tool. When power tool 300 is a mains powered power tool, the power source illustratively includes a rectifier (not shown) that is connected to mains that provide AC. The rectifier rectifies the AC and provides DC to power the motor. The motor 12 is coupled with an output 306 which may include a transmission 308 and a chuck 310 to retain a tool (not shown) in the drill.

Switch 16, which may illustratively be a trigger switch as discussed, may illustratively be packaged in a module 312 that includes controller 26, which may illustratively include the above described motor control circuit 100. Thus, motor control circuit 100 for controlling power to motor 12 and that brakes motor 12 is packaged as part of the module that includes switch 16.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor braking circuit, comprising a braking power switching device coupled across windings of a motor that is repeatedly cycled open and closed by a sequence of pulses generated by the motor braking circuit to intermittently short the windings to brake the motor, the motor braking circuit adjustable to vary at least one of a duty cycle and frequency of the sequence of pulses, the braking power switching device having a small amount of resistance to reduce peak current flow when the windings are shorted through the braking power switching device.

2. The motor braking circuit of claim 1 wherein the braking power switching device is a FET.

3. The motor braking circuit of claim 2 wherein the FET is a MOSFET.

4. The motor braking circuit of claim 2 and further including a controller coupled to the FET that upon power to the motor being disconnected generates the sequence of pulses to switch the FET on and off.

5. The motor braking circuit of claim 4 wherein the controller includes a timer for generating the sequence of pulses.

6. The motor braking circuit of claim 5 wherein the controller includes an adjustment circuit coupled to the timer for adjusting the at least one of the duty cycle and the frequency of the sequence of pulses output by the timer.

7. The motor braking circuit of claim 6 wherein the sequence of pulses comprises a pulse width modulated signal.

8. The motor braking circuit of claim 5 and further including a storage capacitor that is charged when power is connected to the motor and that provides power to the motor braking circuit when power to the motor is disconnected.

9. The motor braking circuit of claim 2 wherein an internal diode of the FET is used in lieu of a separate diode across the windings of the motor.

10. The motor braking circuit of claim 1 and further including a controller for repeatedly cycling the braking power switching device open and closed when a switch that activates the motor when closed is opened.

11. The motor braking circuit of claim 10 and further including a storage capacitor that is charged when power is connected to the motor and that provides power to the motor braking circuit when power to the motor is disconnected.

12. The motor braking circuit of claim 10 wherein the switch provides a signal to the controller based on how far the switch is depressed, the controller controlling the speed of the motor in response to the signal provided by the switch.

13. The motor braking circuit of claim 1 wherein the motor is a DC motor.

14. The motor braking circuit of claim 13 wherein the DC motor is a permanent magnet DC motor.

15. The motor braking circuit of claim 1 wherein the motor is a mains powered motor.

16. A motor braking circuit, comprising:
a FET coupled across windings of a motor, wherein the FET includes an internal diode coupled across the windings of the motor that acts as a free wheeling diode and is used in lieu of a separate free wheeling diode;
a controller coupled to the FET that, upon the motor being switched off, generates a sequence of pulses that switch the FET on and off to brake the motor, the controller adjustable to vary at least one of a duty cycle and a frequency of the sequence of pulses; and
a storage capacitor that is charged when power to the motor is switched on and that provides power for the motor braking circuit when power to the motor is switched off.

17. The motor braking circuit of claim 16 wherein the controller outputs a free running pulsating signal to the braking power switching device.

18. The motor braking circuit of claim 17 wherein the free running pulsating signal is a pulse width modulated signal.

19. The control circuit of claim 17 wherein the free running pulsating signal is a square wave.

20. The motor braking circuit of claim 16 wherein the controller outputs a pulse width modulated signal to generate the sequence of pulses and varies at least one of the duty cycle and frequency of the pulse width modulated signal to control braking of the motor.

21. A control circuit for a motor, comprising a switch for activating the motor when the switch is on, a controller, a FET coupled across windings of the motor and coupled to the controller, the FET having an internal diode coupled across the windings of the motor, the internal diode of the FET acting as a freewheeling diode and used in lieu of a separate diode, the controller cycling the FET on and off to brake the motor when the switch is switched off.

22. The control circuit of claim 21 wherein the motor is a DC motor and the switch connects the motor to a source of DC power to activate the motor when the switch is on and disconnects the motor from the source of DC power to deactivate it when the switch is off, and further including a storage capacitor that is charged when the switch is on and provides power for the controller and the FET when the switch is off.

23. The control circuit of claim 21 wherein the FET is a MOSFET.

24. The control circuit of claim 21 wherein the motor is a mains powered motor.

25. The control circuit of claim 21 wherein the motor is a DC motor coupled to a battery, the motor remaining connected to the battery when the switch is off deactivating the motor so that power generated during braking the motor recharges the battery at least in part.

26. The control circuit of claim 21 wherein the switch is a trigger switch housed in a module that also houses the FET.

27. The control circuit of claim 21 wherein the controller controls braking of the motor by varying at least one of a duty cycle and frequency of a pulse width modulated signal that the controller outputs to the FET.

28. The control circuit of claim 27 wherein the controller senses at least one of motor speed and back emf of the motor and controls braking of the motor based on the at least one of motor speed and back emf of the motor.

29. The control circuit of claim 21 wherein the controller outputs a free running pulsating signal to the FET.

30. The control circuit of claim 29 wherein the free running pulsating signal is a pulse width modulated signal.

31. The control circuit of claim 29 wherein the free running pulsating signal is a square wave signal.

32. The control circuit of claim 21 wherein the switch is a trigger switch that provides a signal to the controller based on how far the switch is depressed, the controller controlling the speed of the motor in response to the signal provided by the trigger switch.

33. The control circuit of claim 32 wherein the trigger switch includes a potentiometer that provides the signal to the controller based on how far the switch is depressed.

34. A power tool, comprising:
a housing surrounding a motor;
a switch for activating the motor when the switch is on;
a controller; and
a braking switching device coupled across windings of the motor and coupled to the controller, the controller cycling the braking switching device open and closed with a sequence of pulses to intermittently short the windings to brake the motor when the switch is switched off, the controller adjustable to vary at least one of a duty cycle and a frequency of the sequence of pulses, the braking switching device having a small amount of resistance to reduce peak current flow when the windings are shorted through the braking switching device.

35. The power tool of claim 34, wherein the braking switching device includes a semiconductor switch.

36. The power tool of claim 35 wherein the semiconductor switch includes a FET having an internal diode coupled across the windings of the motor, the internal diode of the FET acting as a free wheeling diode and used in lieu of a separate free wheeling diode.

37. The power tool of claim 35 wherein the switch is a trigger switch housed in a module, the braking switching device also housed in the module.

38. The power tool of claim 37 wherein the switch is a trigger switch having a potentiometer that provides a signal to the controller based on how far the switch is depressed, the controller controlling the speed of the motor in response to the signal provided by the potentiometer.

39. The power tool of claim 37 wherein the motor is a DC motor and the switch connects the motor to a source of DC power to activate the motor when the switch is on and disconnects the motor from the source of DC power to deactivate it when the switch is off.

40. The power tool of claim 37 wherein the motor is a mains powered motor.

41. The power tool of claim 35 and further including a battery and a storage capacitor, the motor comprising a DC motor that is coupled to the battery when the switch is on and decoupled from the battery when the switch is off, the storage capacitor being charged by the battery when the switch is on and providing power to the controller and semiconductor switch when the switch is off.

42. A method of braking a motor, comprising cycling a braking switching device coupled across windings of the motor open and closed to intermittently short the windings to brake the motor by pulsing the braking switching device with a pulsating signal and adjusting at least one of a duty cycle and frequency of the pulsating signal, the braking switching device having a small amount of resistance to reduce peak current flow when the windings are shorted through the braking switching device.

43. The method of claim 42, wherein cycling the braking switching device open and closed includes switching a semiconductor switch coupled across the windings of the motor on and off.

44. The method of claim 43, wherein pulsing the semiconductor switch includes pulsing it with a pulse width modulated signal and varying at least one of a duty cycle and frequency of the pulse width modulated signal to vary at least one of a braking speed and braking current.

45. In a cordless power tool having a permanent magnet DC motor, a switch that activates the motor when switched on and deactivates the motor when switched off, a method of braking the motor, comprising switching a semiconductor switch coupled across the windings of the motor on and off to intermittently short the windings to brake the motor by pulsing the semiconductor switch with a pulsating signal and adjusting at least one of a duty cycle and frequency of the pulsating signal, the semiconductor switch having a small amount of resistance to reduce peak current flow when the windings are shorted through the semiconductor switch.

46. The method of claim 45 and further including charging a storage capacitor when the switch is on and providing power to the semiconductor switch from the storage capacitor when the switch is switched off.

47. The method of claim 46 wherein the semiconductor switch is a MOSFET having an internal diode coupled across the windings of the motor, the method further including using the internal diode of the MOSFET as a free wheeling diode in lieu of a separate free wheeling diode.

48. In a power tool having a mains powered motor, a switch that activates the motor when switched on and deactivates the motor when switched off, a method of braking the motor, comprising switching a semiconductor switch coupled across the windings of the motor on and off to intermittently short the windings to brake the motor by pulsing the semiconductor switch with a pulsating signal and adjusting at least one of a duty cycle and frequency of the pulsating signal, the semiconductor switch having a small amount of resistance to reduce peak current flow when the windings are shorted through the semiconductor switch.

49. The method of claim 48 and further including charging a storage capacitor when the switch is on and providing power to the semiconductor switch from the storage capacitor when the switch is switched off.

50. The method of claim 49 wherein the semiconductor switch is a MOSFET having an internal diode coupled across the windings of the motor, the method further including using the internal diode of the MOSFET as a free wheeling diode in lieu of a separate free wheeling diode.

51. A power tool, comprising:
a housing surrounding a motor;
a switch for activating the motor when the switch is on;
a controller; and
a FET coupled across windings of the motor and coupled to the controller, the controller cycling the FET open and closed to brake the motor when the switch is switched off, the FET having an internal diode coupled across the windings of the motor, the internal diode of the FET acting as a freewheeling diode and used in lieu of a separate freewheeling diode.

52. A power tool, comprising:
a housing surrounding a motor;
a switch for activating the motor when the switch is on;
a controller; and
a FET coupled across windings of the motor and coupled to the controller, the controller cycling the FET open and closed to intermittently short the windings to brake the motor when the switch is switched off, the FET having an internal diode coupled across the windings of the motor, the internal diode of the FET acting as a freewheeling diode and used in lieu of a separate freewheeling diode, the FET having a small amount of resistance to reduce peak current flow when the windings are shorted through the FET.

53. The power tool of claim 52 wherein the switch is a trigger switch housed in a module that also houses the controller and FET.

* * * * *